United States Patent
Goyal et al.

(10) Patent No.: US 12,451,713 B2
(45) Date of Patent: Oct. 21, 2025

(54) DETECTING MECHANICAL STRESS ACTING UPON A SYSTEM

(71) Applicant: Hilti Aktiengesellschaft, Schaan (LI)

(72) Inventors: Varnim Goyal, Kaufering (DE); Bernd Ziegler, Schwabmuenchen (DE); Roman Justus, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 562 days.

(21) Appl. No.: 17/620,225

(22) PCT Filed: Jun. 16, 2020

(86) PCT No.: PCT/EP2020/066606
§ 371 (c)(1),
(2) Date: Dec. 17, 2021

(87) PCT Pub. No.: WO2020/260068
PCT Pub. Date: Dec. 30, 2020

(65) Prior Publication Data
US 2022/0239112 A1 Jul. 28, 2022

(30) Foreign Application Priority Data
Jun. 25, 2019 (EP) .................................. 19182260

(51) Int. Cl.
*H02J 7/00* (2006.01)
*G01R 31/36* (2020.01)
(Continued)

(52) U.S. Cl.
CPC .......... *H02J 7/007* (2013.01); *G01R 31/3644* (2013.01); *H01M 10/425* (2013.01);
(Continued)

(58) Field of Classification Search
CPC ........ H02J 7/007; H02J 7/0029; H02J 7/0063; H02J 7/345; H01M 50/583; H01M 10/44;
(Continued)

(56) References Cited

U.S. PATENT DOCUMENTS

| 2005/0077878 A1 | 4/2005 | Carrier et al. |
| 2007/0244471 A1 | 10/2007 | Malackowski et al. |

(Continued)

FOREIGN PATENT DOCUMENTS

| CN | 101078661 A | 11/2007 |
| CN | 101231302 A | 7/2008 |

(Continued)

OTHER PUBLICATIONS

International Search Report of PCT/EP2020/066613, dated Sep. 18, 2020.

(Continued)

*Primary Examiner* — Nathaniel R Pelton
(74) *Attorney, Agent, or Firm* — Davidson Kappel LLC

(57) ABSTRACT

Process for controlling a battery including energy storage cells, a controlling device, a sensor for detecting mechanical parameter or electrical parameter, a safety device, an interface for connecting the battery to an external device and electrical wiring. The process includes detecting parameter and eliminating the provision of electric energy from the energy storage cells, if a detected parameter reaches a predetermined threshold value. Battery including a energy storage cell, a controlling device, a sensor for detecting mechanical parameter or electrical parameter, an interface for connecting the battery to an external device, electrical wiring for transmitting electric energy between the at least one battery cell and the external device. The battery includes a safety device for eliminating the provision of electric energy from the energy storage cells, if a parameter detected (Continued)

by the sensor reaches a predetermined threshold value. System including a battery and an external device connectable to the battery.

17 Claims, 7 Drawing Sheets

(51) Int. Cl.
H01M 10/42 (2006.01)
H01M 10/44 (2006.01)
H01M 10/48 (2006.01)
H01M 50/583 (2021.01)
H02J 7/34 (2006.01)

(52) U.S. Cl.
CPC ........... H01M 10/44 (2013.01); H01M 10/48 (2013.01); H01M 10/486 (2013.01); H01M 50/583 (2021.01); H02J 7/0029 (2013.01); H02J 7/0063 (2013.01); H02J 7/345 (2013.01); *H01M 2200/103* (2013.01)

(58) Field of Classification Search
CPC ............... H01M 10/48; H01M 10/486; H01M 2200/103; G01R 31/3644
USPC .......................................................... 320/136
See application file for complete search history.

(56) References Cited

U.S. PATENT DOCUMENTS

| | | | |
|---|---|---|---|
| 2008/0012529 A1* | 1/2008 | Chang | H02J 7/0016 320/116 |
| 2008/0084180 A1 | 4/2008 | Hasegawa et al. | |
| 2008/0174444 A1 | 7/2008 | Noda et al. | |
| 2010/0121226 A1 | 5/2010 | Ten Kate et al. | |
| 2010/0176766 A1 | 7/2010 | Brandner et al. | |
| 2012/0154979 A1 | 6/2012 | Signorelli et al. | |
| 2012/0242144 A1 | 9/2012 | Chorian et al. | |
| 2012/0279742 A1 | 11/2012 | Roser et al. | |
| 2013/0307478 A1 | 11/2013 | Boggs et al. | |
| 2013/0307480 A1* | 11/2013 | Boggs | B60L 58/10 320/118 |
| 2014/0009113 A1 | 1/2014 | Robins et al. | |
| 2014/0062410 A1* | 3/2014 | Schaefer | H01M 50/105 429/61 |
| 2014/0379188 A1 | 12/2014 | Uesaka et al. | |
| 2015/0109129 A1 | 4/2015 | Merril et al. | |
| 2017/0008417 A1 | 1/2017 | Yoshida et al. | |
| 2017/0074899 A1 | 3/2017 | Jnichi et al. | |
| 2017/0096127 A1 | 4/2017 | Zhang et al. | |
| 2017/0276572 A1 | 9/2017 | Chen et al. | |
| 2018/0026312 A1* | 1/2018 | Hinterberger | H01M 10/4257 429/177 |
| 2018/0041062 A1 | 2/2018 | Ziegler et al. | |
| 2018/0054502 A1 | 2/2018 | Wilson et al. | |
| 2018/0183120 A1 | 6/2018 | Chan et al. | |
| 2018/0331335 A1 | 11/2018 | Klee | |
| 2019/0198940 A1 | 6/2019 | Komiyama et al. | |
| 2020/0044209 A1 | 2/2020 | Huggins et al. | |
| 2020/0153225 A1 | 5/2020 | Kralik et al. | |
| 2020/0303937 A1* | 9/2020 | Melman | H02J 7/0063 |
| 2020/0313453 A1* | 10/2020 | Huggins | H02J 7/00045 |
| 2021/0123737 A1* | 4/2021 | Vetter | G07C 3/00 |
| 2022/0084388 A1* | 3/2022 | Schmidt | G08B 29/188 |
| 2022/0239139 A1 | 7/2022 | Goyal et al. | |

FOREIGN PATENT DOCUMENTS

| | | |
|---|---|---|
| CN | 101777673 A | 7/2010 |
| CN | 102637844 A | 8/2012 |
| CN | 202869717 U | 4/2013 |
| CN | 103538018 A | 1/2014 |
| CN | 103987564 A | 8/2014 |
| CN | 106527343 A | 3/2017 |
| CN | 106232446 A | 4/2017 |
| CN | 107112783 A | 8/2017 |
| CN | 108701876 A | 10/2018 |
| DE | 102012017190 A1 | 3/2014 |
| DE | 102013201345 A1 | 7/2014 |
| EP | 0345655 A2 | 12/1989 |
| EP | 3200313 A1 | 8/2017 |
| EP | 3223202 A1 | 9/2017 |
| JP | 2010038839 A | 2/2010 |
| WO | WO2013104700 A1 | 7/2013 |
| WO | WO2020/260068 A1 | 12/2020 |
| WO | WO2020/260079 A1 | 12/2020 |
| WO | WO2020260069 A1 | 12/2020 |

OTHER PUBLICATIONS

International Search Report of PCT/EP2020/066681, dated Sep. 18, 2020.

International Search Report of PCT/EP2020/066606, dated Aug. 25, 2020.

\* cited by examiner

DETECTING MECHANICAL STRESS ACTING UPON A SYSTEM

SUMMARY OF THE INVENTION

The present invention relates to a process for controlling a battery comprising at least one energy storage cell, a controlling device, at least one sensor for detecting at least one mechanical parameter or electrical parameter, a safety device, an interface for connecting the battery to an external device as well as electrical wiring for transmitting electric energy between the at least one battery cell and the external device.

Beyond that the present invention also relates to a battery comprising at least one energy storage cell, a controlling device, at least one sensor for detecting mechanical parameters or electrical parameters, an interface for connecting the battery to an external device as well as electrical wiring for transmitting electric energy between the at least one battery cell and the external device Furthermore, the invention also relates to a system comprising a battery and a power tool powered by the battery.

In particular, the present invention relates to a battery for supplying electric energy to a power tool. The power tool can be a hand-held power tool and, for example, in the shape of a cordless screwdriver, circular saw, jigsaw, reciprocating saw, cordless drill or the like.

On a building site when operating a system comprising a power tool powered by a battery it is not unusual to unintentionally dropping the system from a certain height onto the ground. Additionally, it is not uncommon to intentionally throwing the system a certain distance also resulting in dropping onto the ground.

Modern power tools as well as batteries are very robust and can withstand a relative high amount of abuse, rough handling as well as almost any kinds of mechanical or electrical stress and strain. Dropping and falling even relative high distances to a hard and inelastic ground do not harm the power tool and/or battery. Beyond that, power tools are usually able to withstand a wide range and relative high amounts of vibration before failing. Also, shocks other than those resulting from dropping the power tool are normally no bigger problems for modern power tools. It has been observed that power tools and even battery packs have been misused as hammers to drive nails into objects. Even though using a modern power tool and/or battery pack as a hammer can be considered a relative high level of abuse, most modern power tools and battery packs are moderately able to withstand being used as a hammer.

However, it is still possible that the system comprising the power tool and battery is getting damaged after being subject to mechanical stress and/or strain. It is even possible that the battery is getting damaged after being subject to electrical stress and/or strain. In the case of a damaged power tool and/or battery continuing operating the system could be potentially dangerous for a user. In that context, it is difficult for a user of the system to tell if an abuse, in particular, a drop harmed the system, or not.

Beyond that, even though no noticeable mechanical stress or obvious misuse happened to the system and in particular to the battery, it is still possible that an electrical failure or malfunction could occur within the power tool and/or battery. Over-charging the cells, deep discharging the cells, exposing the cells to extreme temperatures (i.e. too hot or too cold) can unnoticeably result in damaging the cells and the battery in total.

It is an object of the present invention to provide a process for controlling a battery comprising at least one energy storage cell, a controlling device, at least one sensor for detecting at least one mechanical parameter or electrical parameter, a safety device, an interface for connecting the battery to an external device as well as electrical wiring for transmitting electric energy between the at least one battery cell and the external device, in order to increase the safety for a user.

Also, it is an object of the present invention to provide a battery comprising at least one energy storage cell, a controlling device, at least one sensor for detecting mechanical parameters or electrical parameters, an interface for connecting the battery to an external device as well as electrical wiring for transmitting electric energy between the at least one battery cell and the external device, in order to increase the safety for a user.

Likewise, it is also an object of the present invention to provide a system comprising a battery and a power tool powered by the battery, in order to increase the safety for a user.

According to the present invention, there is provided a process for controlling a battery comprising at least one energy storage cell, a controlling device, at least one sensor for detecting at least one mechanical parameter or electrical parameter, a safety device, an interface for connecting the battery to an external device as well as electrical wiring for transmitting electric energy between the at least one battery cell and the external device.

The process comprises the steps of detecting at least one parameter by means of the sensor; and eliminating the provision of electric energy from the at least one energy storage cell by means of a safety device, if a detected parameter reaches a predetermined threshold value.

It has to be understood that "reaching" a predetermined threshold value means that a detected parameter either decreased or increased its value, in order to reach (or at least match) the predetermined threshold value.

In a preferred embodiment of the present invention, eliminating the provision of electric energy from the at least one energy storage cell is done by interrupting the electrical wiring by means of a circuit interrupting device, in order to stop the transfer of electric energy between the at least one energy storage cell and the external device.

In another preferred embodiment of the present invention, eliminating the provision of electric energy from the at least one energy storage cell is done by discharging the at least one energy storage cell by means of a discharging device, in order to stop the transfer of electric energy between the at least one energy storage cell and the external device.

According to the present invention, there is provided a battery comprising at least one energy storage cell, a controlling device, at least one sensor for detecting mechanical parameters or electrical parameters, an interface for connecting the battery to an external device as well as electrical wiring for transmitting electric energy between the at least one battery cell and the external device.

Furthermore, the battery comprises a safety device for eliminating the provision of electric energy from at least one energy storage cell, if a parameter detected by the at least one sensor reaches a predetermined threshold value.

In a preferred embodiment of the present invention, the safety device is in form of a circuit interrupting device for interrupting the electrical wiring, in order to stop the transfer of electric energy between the at least one energy storage cell and the external device.

In a further preferred embodiment the circuit interrupting device is in form of at least one hard fuse.

In yet another preferred embodiment of the present invention, the safety device is in form of a discharging device for discharging the at least one battery cell, if a parameter detected by the at least one sensor reaches a predetermined threshold value.

Furthermore, in another preferred embodiment, the discharging device is in form of at least one resistor, LED or capacitor.

According to another preferred embodiment the battery comprises a transceiver for sending signals regarding the detected parameters and for receiving signals to activate the circuit interrupting device for interrupting the electrical wiring, in order to stop the transfer of electric energy between the at least one battery cell and the external device.

According to the present invention, there is also a system comprising a battery and an external device connectable to the battery.

The external device can be in form of a power tool, charger, discharger or the like.

Further advantages and preferred embodiments will be described in the following together with the drawings listed below. The expressions "left", "right", "below" and "above" used in the following description, are referred to the drawings in an alignment such that the reference numbers and the notation of the Figures used can be read in normal.

DETAILED DESCRIPTION

Example

Figure 1:
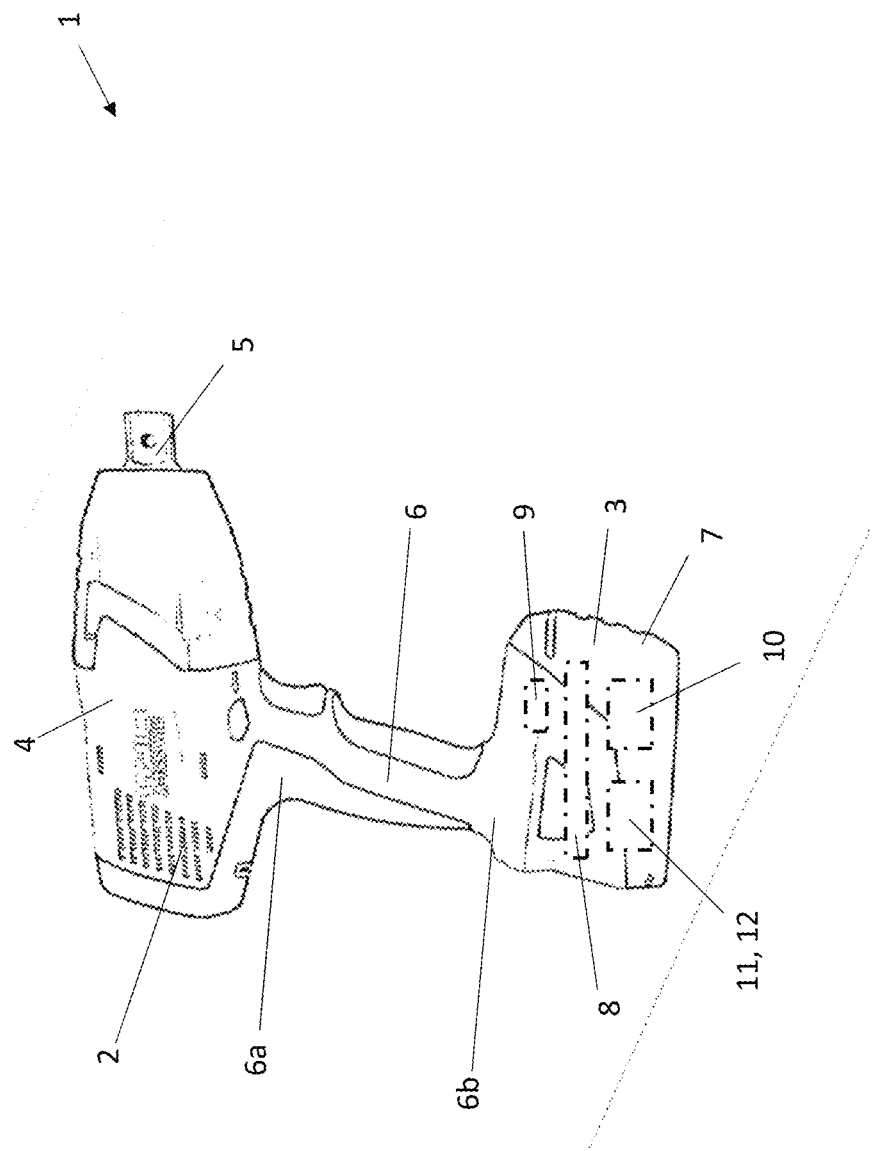
FIG. 1 a side-view of an inventive system with a hand-held power tool and a battery.

FIG. 1 shows a system 1 comprising a handheld power tool 2 as well as a battery 3. The battery 3 is removable attached to the power tool 2, in order to supply electric energy to the power tool 2. Within the example shown, the power tool 2 is in form of a cordless screw driver. It is however possible that the power tool is in form of a cordless saw, grinder, drill or the like.

The handheld power tool 2 embodied as a cordless screw driver comprises essentially a housing 4, an electric motor, a gear box, a tool holding device 5 and a handle 6. The handle 6 comprises an upper end 6a and lower end 6b, whereby the battery 3 is removable attached to the lower end 6b of the handle 6.

A drive shaft of the electric motor is connected via the gear box to the tool holding device 5, in order to eventually transfer a torque produced by the electric motor to a tool (e.g. a bit) held by the tool holding device 5. The electric motor, the drive shaft as well as the gear box are not illustrated in the figures.

The battery 3 comprises a housing 7, in which several energy storage cells 8 for storing and releasing electrical energy are positioned. Beyond that, the battery also comprises a safety device. As explained later in more detail, the safety device can be in form of a circuit interrupting device for interrupting a circuit of the battery or in form of a discharging device for discharging battery cells. The safety device can also combine a circuit interrupting device and a discharging device, i.e. both functions are within one safety device.

Figure 5:
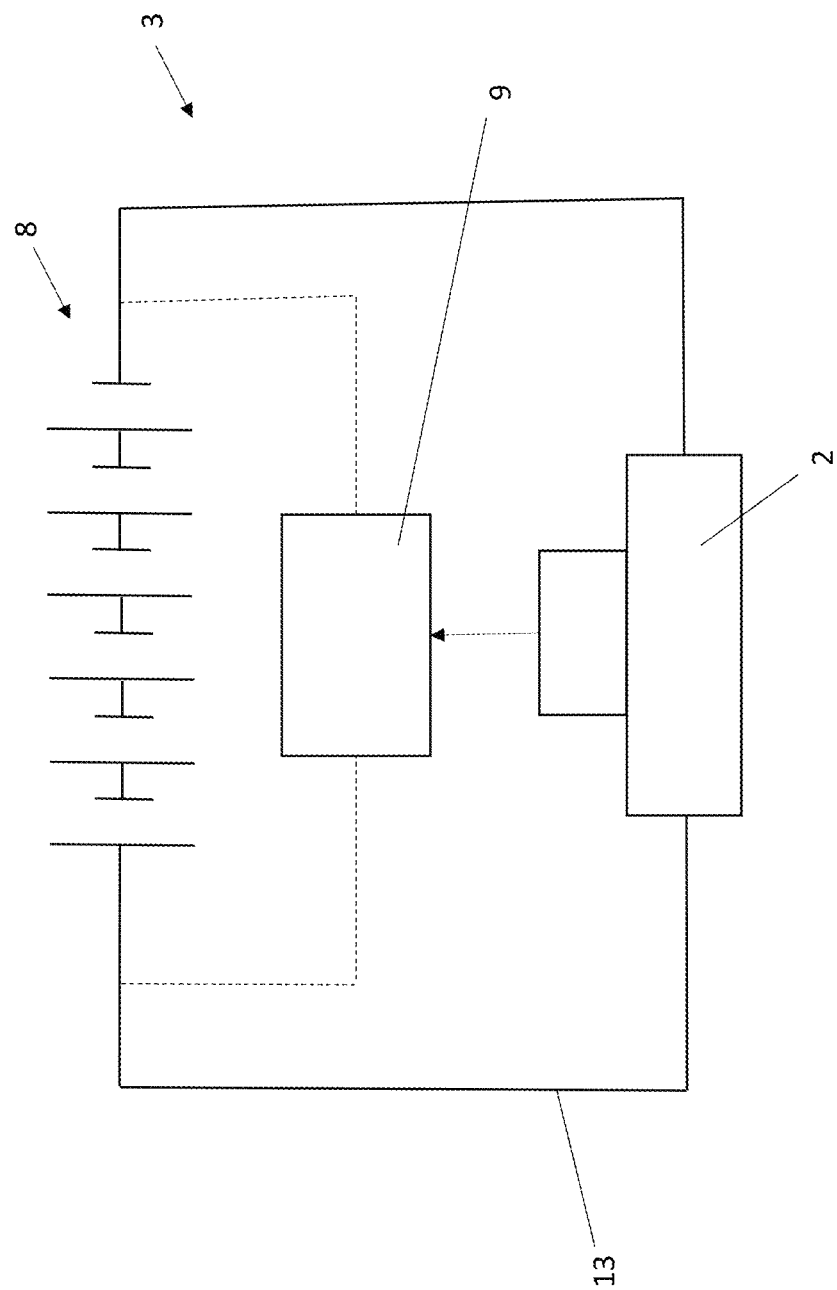
FIG. 5 a schematic circuit diagram of the inventive battery according to a fourth embodiment.

The energy storage cells 8 can also be termed battery cells or cells. In addition to that, the battery 3 also comprises a controlling device 9 for controlling and regulating all processes within the battery 3. Beyond that, the controlling device 9 controls and regulates all processes regarding the communication and transfer of electric energy with external devices 2. An external device 2 could be a power tool, charger, discharger or the likes. The controlling device 9 can also be termed central processing unit (CPU), battery management system, battery management device, central processor or main processor. Also, the controlling device 9 comprises a memory (i.e. storage element) and a clock (or stop watch) for measuring and recording time, time periods and time intervals. Also, the battery 3 comprises an interface for connecting the battery 3 to an external device 2. As seen in FIG. 1, the external device 2 is in form of a hand-held power tool. As shown in FIG. 5, the external device 2 can also be a discharge device for discharging the battery cells 8. Alternatively, the external device 2 can be a charger for charging the battery cells 8. The charging device and discharging device can be combined in just one device.

In addition to that, the battery 3 comprises a sensor 10 for detecting various parameters. The sensor 10 is positioned within the housing 7 of the battery 3. The sensor 10 is either configured to detect mechanical or electrical parameters. It is also possible that the sensor 10 is configured to detect mechanical parameter and electrical parameter. According to an alternative embodiment of the battery 3, the battery 3 comprises a first sensor configurated to detect mechanical parameters and a second sensor configurated to detect electrical parameters.

A mechanical parameter can be acceleration, vibration, temperature, pressure or shock.

According to a first example of the battery 3, the sensor 10 configurated to detect mechanical parameters is in form of an accelerometer. According to another example of the battery 3, the sensor 10 configurated to detect mechanical parameters is in form of a piezoelectric sensor.

FIG. 1 illustrates a battery 3 with an accelerometer 10 within the housing 7 of the battery 3.

The acceleration sensor 10 or accelerometer serves to record and measure accelerations, i.e. acceleration values, effecting the battery 3. The accelerometer 10 used within the inventive system is formed to record and measure G-forces (i.e. gravitational forces: 1 g equals to 9,81 m/s$^2$) and in particular the gravitational forces and the ground reaction forces. The accelerometer 10 is configured to record and measure acceleration values in a X-Y and Z-direction of the system 1. The X-Y and Z-direction can also be understood as X-Y and Z-axes. Also, the acceleration sensor is able to detect, measure and record vibrations occurring to the system 1.

An electrical parameter can be current, voltage, capacity, the state of charge or state of health. In particular, the sensor 10 configurated to detect electrical parameters is able to detect an over-voltage, over-current, or deep-discharge of the battery cells 8. The sensor 10 could also be configured to detect temperature, the state-of-charge or the state-of-health of the battery cells 8.

The sensor 10 configured to detect electrical parameters can be in form of a device for measuring a voltage of the energy storage cells. The device for measuring a voltage 10 is also positioned within the housing 7 of the battery 3. The device for measuring a voltage 10 can also be termed voltmeter. According to an alternative embodiment of the present invention, the device for measuring a voltage or an additional device for measuring a voltage can be positioned within the housing 4 of the power tool 2. The device for measuring a voltage 10 is configured to measure the voltage of the energy storage cells 8 in regular or irregular time intervals.

Beyond that, the device for measuring a voltage 10 is connected to the controlling device 9, in order to transfer and receive signals and data.

As already mentioned above, the sensor 10 is connected to the controlling device 9, in order to transfer and receive signals and data. The controlling device 9 comprises a memory for storing pre-determined data and threshold values. The memory is also able to receive and store data, values and parameters detected by a sensor 10. By transferring data, i.e. detected parameters, from the sensor 10 to the controlling device 9, the controlling device 9 is able to compare the detected parameters with pre-determined threshold values.

Additionally, the system 1 also comprises a device for discharging the energy storage cell 11, which serves to discharge or drain an electrical charge from each energy storage cell 8. The device for discharging the energy storage cell 11 can also be termed discharging device and can be in form of one or more resistors or one or more capacitors. According to a preferred embodiment of the present invention the device for discharging the energy storage cell 11 is located within the housing 7 of the battery 3. In an alternative embodiment of the present invention it is also possible that a single or additional device for discharging the energy storage cell 11 is located within the housing 4 of the external device 2.

Beyond that, the device for discharging the energy storage cell 11 is connected to the controlling device 9, in order to transfer and receive signals and data.

Furthermore, the battery 3 comprises a circuit interrupting device 12 in form of a hard fuse. The circuit interrupting device 12 is positioned within the electrical wiring 13, which serves to transmit electric energy between the battery cells 11 and the external device 2. The circuit interrupting device 12 is connected to the controlling device 9 to receive a signal when to interrupt the electrical wiring 13 and thereby stopping electric energy being send from the battery cells 8 to the external device 2. The electrical wiring 13 can also be termed circuit, wiring, lines or the like.

In addition to that, the battery 3 comprises a transceiver 14 for sending out signals regarding the detected parameters. For this, the transceiver 14 is connected to the sensor 10, in order to receive and transmit data between the transceiver 14 and sensor 10. By means of the transceiver 14 the battery 3 is able to communicate with an external memory, data base and/or cloud. The communication with the external memory and data base can be implemented by cloud computing. by means of the transceiver 14 the battery 3 can be part of the Internet of Things (IoT) using transmission technology such as bluetooth mesh networking, light-fidelity, near-field communication, radio-frequency identification, Wi-Fi, ZigBee, Z-Wave, LTE-Advanced, low-power wide-area networking, very small aperture terminal, ethernet or power-line communication.

By means of the transceiver 14 it is possible to send data from the battery 3 via IoT to the cloud and also for the battery 3 to receive data from the cloud. The data received from the cloud can be used either to allow the controlling device 9 to initiate respective activities within the battery 3. A respective activity can be interrupting the electrical wiring 13 to stop transmitting electric energy from the cells 8 to an external device 2. However, the transceiver 14 can also be used to send data concerning the status of the battery 3 to the cloud. If for some reason the circuit interrupting device 12 was activated to interrupt the electrical wiring 13 within the battery 3, the status of the battery 3 having an interrupted circuit 13 is send to the cloud. Based on the information in the cloud that the battery 3 is not functioning anymore, a new battery can be send to the user, in order to replace the damaged battery.

Additionally, the battery 3 comprises a signal transmitter in form of a multi-colored LED-light. The LED-light is able to emit three colors, i.e. red, yellow or green. The color code represents a critical condition for the system(=red), a warning for the system(=yellow) or an uncritical condition for the system. The signal transmitter is not shown within the figures.

According to an alternative embodiment of the present invention, the battery 3 also comprises a strain gauge. It is possible that the system comprises more than one strain gauge. At least one strain gauge is positioned within the housing 7 of the battery 3. The strain gauge serves to measure and record strain on the battery 3. Also, the strain gauge is connected to the controlling device, in order to transfer and receive signals and data.

All the sensors 10 are frequently measuring and recording the condition of the battery 3 in terms of detected values. Subject to the detected values, it is possible to interpret the events causing the detected values and consequently to categorize the effects these events are having on the battery 3. Thereby, the battery 3 is able to identify stress, abuse, malfunction or any other form of improper handling of the battery 3 by just one effect or several effects in combination.

According to that, if the acceleration sensor 10 is detecting certain acceleration values within a certain range and for a certain time period, the battery 3 is able to identify that the battery 3 is subject to vibrations. If the acceleration values detected by the acceleration sensor 10 exceed a predetermined threshold value for a predetermined time period, the controlling device 9 activates the circuit interrupting device 12, in order to interrupt the circuit 13.

In the case the battery 3 or the power tool 2 connected to the battery 3 is dropped from a certain height to the ground, the accelerometer 10 will measure a value of about zero in X-Y and Z-direction, as the system 1 will be in free fall. Due to measuring uncertainty or measuring errors the measured value of the accelerometer 10 would be in the range of −0.1 g and +0.1 g. Any reading within this range would identify the system 1, i.e. power tool 2 and battery 3, or just the battery 3 as free falling.

When the system 1 or the battery 3 eventually reaches the ground, i.e. moment of impact on the ground, the accelerometer 10 measures a relative high acceleration value in at least one of the X-Y or Z-direction. The acceleration value can be as high as 350 g. The unit g represents gravitational force, i.e. 1 g equals 9.81 m/s2. The reading of the accelerometer 10 can be as high as 5000 g in any of the X-Y and Z-direction at the moment of impact. A first predetermined threshold value for the accelerometer 10 lies between 200 g and 5000 g and determines an impact of the system or the battery 3 on a ground (i.e. floor). The first predetermined threshold value for the accelerometer 3 is saved (i.e. stored) within the memory of the controlling device 9.

Beyond that, a second predetermined threshold value for the accelerometer 10 determines if an impact was critical for the system 1 or battery 3. The second predetermined threshold value for the accelerometer 10 lies above 350 g.

The time from the start of the free fall of the system 1 or the battery 3, i.e. nearly zero measurement of the accelerometer 10, to the moment of impact is recorded by the clock within the controlling device 9. By measuring the time for the system 1 to travel, i.e. fall or drop, to the ground the distance, i.e. drop height, can be calculated by means of the equation:

$$distance = 0.5 \times (acceleration\ value) \times (time2).$$

If the distance (i.e. drop height) is greater than 2 m (i.e. meter), the drop on a hard, non-elastic ground can, in general, be considered critical for the system 1 or the battery 3. A first predetermined threshold value for the distance (i.e. drop height) is 1 m. A second predetermined threshold value for the distance (i.e. drop height) is 1.5 m and a third predetermined threshold value for the distance (i.e. drop height) is 2 m. The first, second and third predetermined threshold values can differ depending on the actual weight, size and complexity of the system 1 and battery 3. With other words: the heavier the system 1 or battery 3, the lower the threshold values.

If the distance (i.e. drop height of the system or the battery) detected by the acceleration sensor 10 exceed a predetermined threshold value, the controlling device 9 interprets the drop as potentially harmful and could have caused damage to the system 1 or battery 3. Consequently, the controlling device 9 activates the circuit interrupting device 12, in order to interrupt the circuit 13.

The piezoelectric sensor 10 is able to detect a shock occurring to the system 1 or battery 3. Due to its abilities the piezoelectric sensor 10 is thereby able to detect shock occurring to the system 1 or battery 3, even if the system 1 or battery 3 is not moving, i.e. stationary. Depending on the magnitude of the shock, damage could occur to the system 1 or battery 3. If a shock measurement done by the piezoelectric sensor 10 is exceeding a threshold value, the controlling device 9 interprets the shock as potentially harmful and could have caused damage to the system 1 or battery 3. Consequently, the controlling device 9 activates the circuit interrupting device 12, in order to interrupt the circuit 13.

As already mentioned, the sensor 10 configured to detect electrical parameters can be in form of a device for measuring a voltage for measuring the voltage of each of the battery cells 8. The device for measuring a voltage 10 is connected to the controlling device 9 and the measurement of the voltage is transferred to the controlling device 9. The device for measuring a voltage 10 is measuring a first and second voltage value. If a difference value between the first and second voltage value is greater than a predetermined threshold value, it can be assumed that the battery 3 is not functioning normally and is potentially damaged. The difference between the first and second detected voltage value could be about 0.1 Volt and should have occurred within 60 seconds. A predetermined threshold value for the difference value is 0.1 Volt and a predetermined threshold value for the time is 60 seconds. With other words: if a voltage difference of at least 0.1 Volt and within a maximum duration of 60 seconds occurs, a critical situation could have happened to the battery 3, i.e. the battery cells 8.

In this context, if the difference value between the first and second voltage value is greater than a threshold predetermined value, the controlling device 9 interprets the situation as potentially harmful to the system 1 or battery 3. Consequently, the controlling device 9 activates the circuit interrupting device 12, in order to interrupt the circuit 13.

Figure 2:
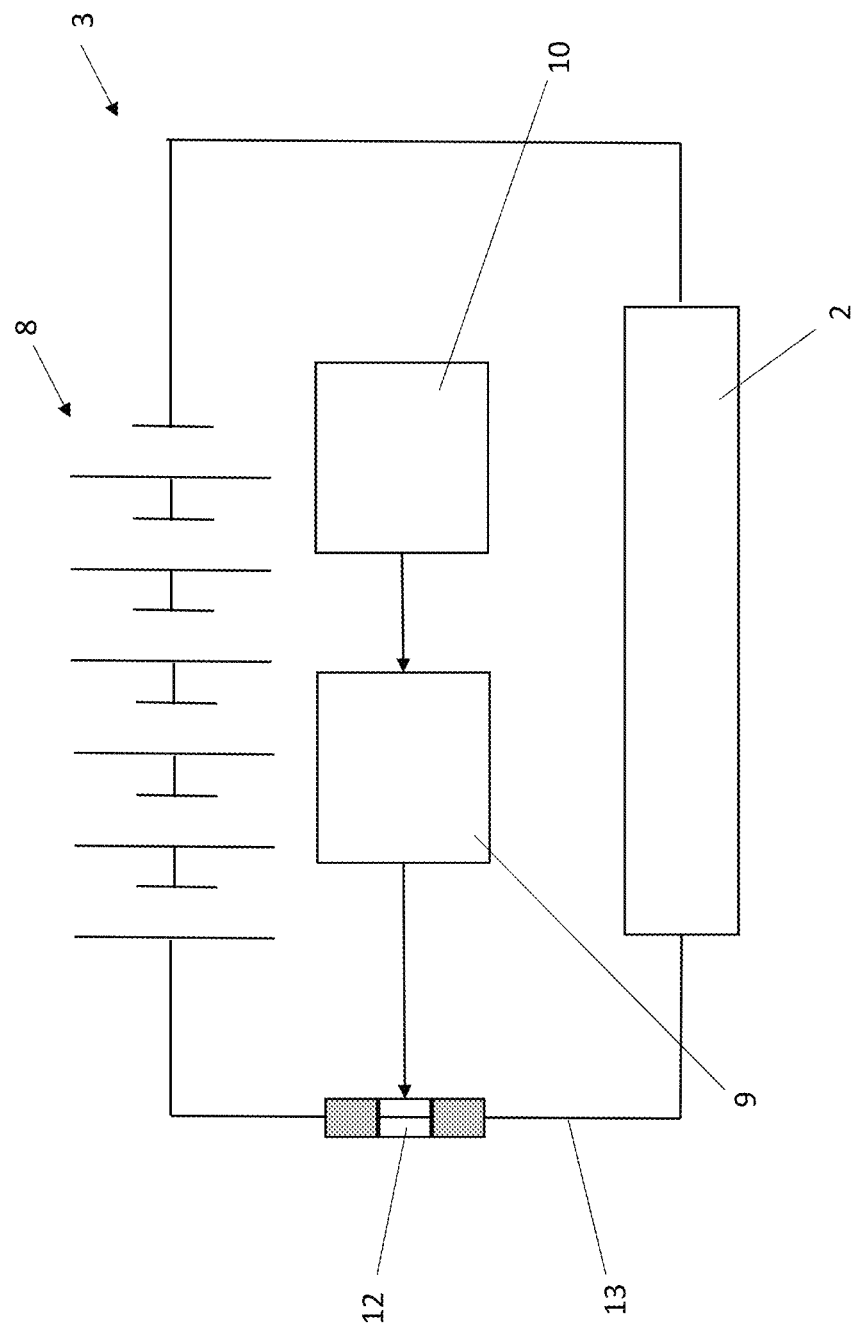
FIG. 2 a schematic circuit diagram of the inventive battery according to a first embodiment.

FIG. 2 shows a first embodiment of the inventive battery 3. According to the first embodiment, the battery 3 comprises a number of cells 8, a sensor 10, a controlling device 9 as well as a circuit interrupting device 12. The circuit interrupting device 12 is in form of a hard fuse. As also shown in FIG. 2, the battery 3 is connected to an external device 2. If a parameter detected by the sensor 10 is exceeding a pre-determined threshold value, the controlling device 9 activates the circuit interrupting device 12, in order to interrupt the circuit 13.

Figure 3:
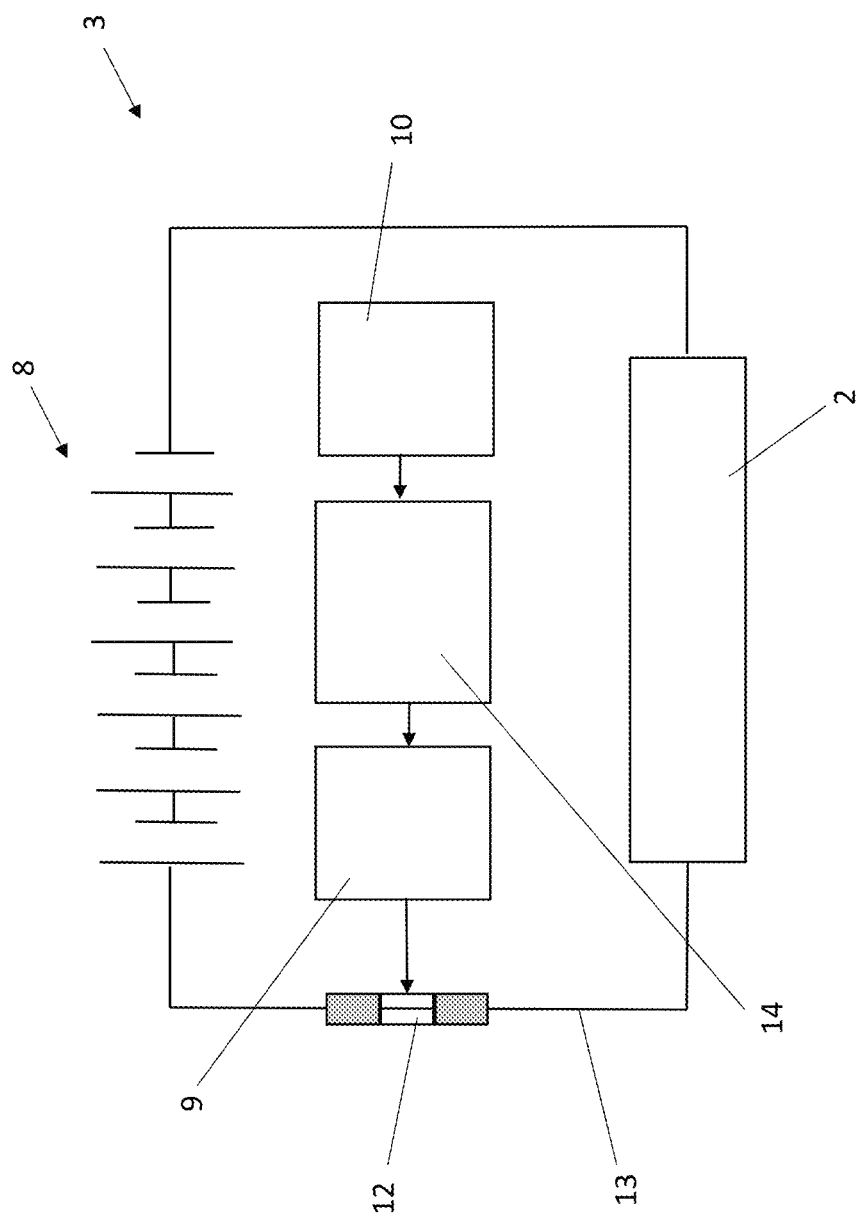
FIG. 3 a schematic circuit diagram of the inventive battery according to a second embodiment.

FIG. 3 shows a second embodiment of the inventive battery 3. According to the second embodiment, the battery 3 comprises a number of cells 8, a sensor 10, a controlling device 9, a transceiver 14 as well as a circuit interrupting device 12. Again, the circuit interrupting device 12 is in form of a hard fuse. As also shown in FIG. 3, the battery 3 is connected to an external device 2. The sensor 10 sends a signal regarding a detected parameter to the transceiver 14. The transceiver 14 is evaluating the detected parameter with a pre-determined threshold value stored within an external computing system and data base. The outcome of the evaluation is send to the transceiver 14. If the evaluation determines that a detected parameter is in fact exceeding a pre-determined threshold value (stored with in a cloud), a lock down receiver connected to the transceiver 14 activates the circuit interrupting device 12, in order to interrupt the circuit 13.

Figure 4:
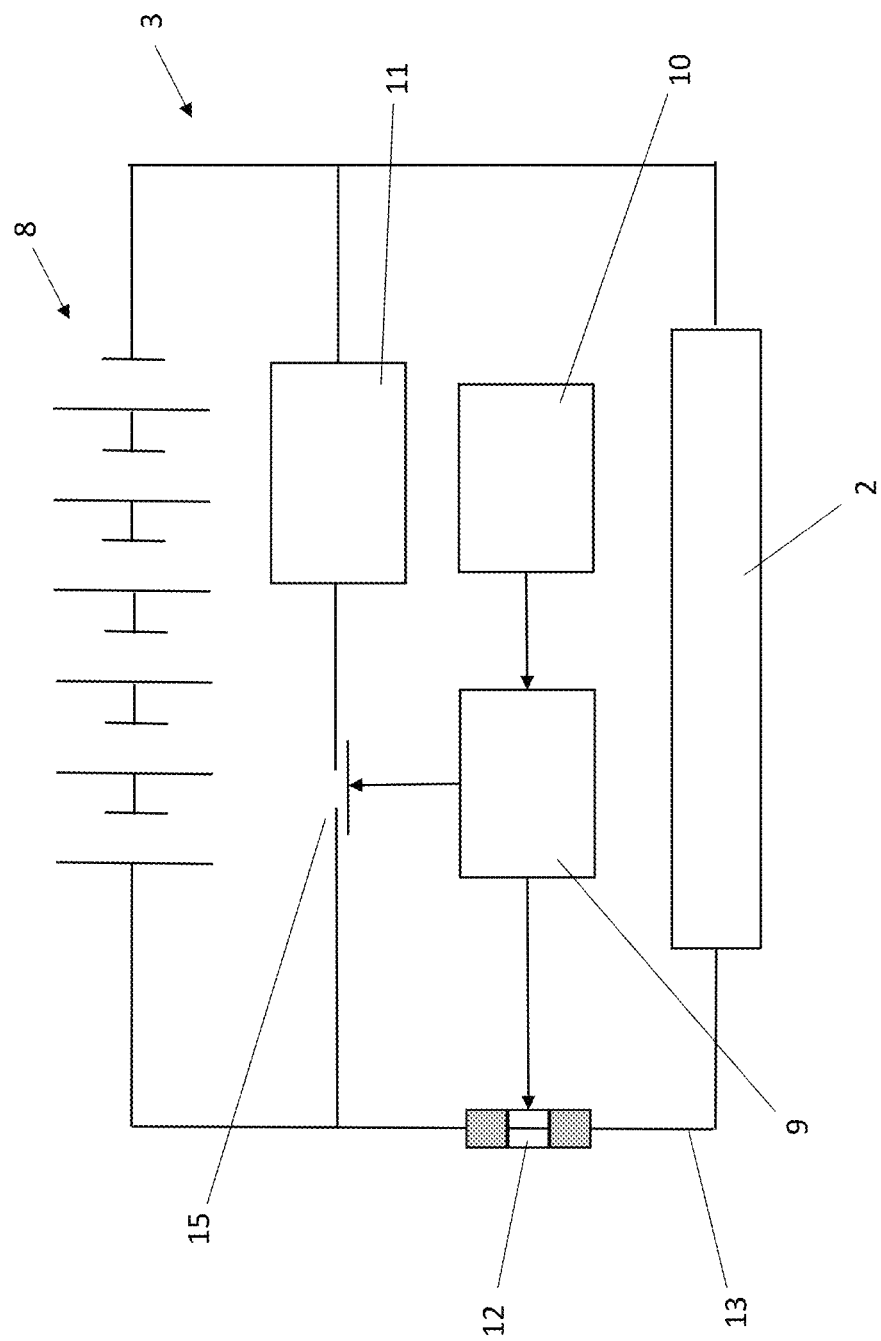
FIG. 4 a schematic circuit diagram of the inventive battery according to a third embodiment.

FIG. 4 shows a third embodiment of the inventive battery 3. According to the third embodiment, the battery 3 comprises a number of cells 8, a sensor 10, a controlling device 9, a discharging device 11 as well as a circuit interrupting device 12. Again, the circuit interrupting device 12 is in form of a hard fuse. As also shown in FIG. 4, the battery 3 is connected to an external device 2.

The discharging device 11 is in form of several LEDs (i.e. light emitting diode) and positioned within the housing 7 of the battery 3. The LEDs are consuming the electric energy of the battery cells 8 and thereby draining, i.e. discharging the battery cells 8. If a parameter detected by the sensor 10 is exceeding a pre-determined threshold value, the controlling device 9 activates the circuit interrupting device 12, in order to interrupt the circuit 13. Also, the controlling device 9 activates an additional switch 15 to activate the discharging device 11. By means of the fuse 12 and the discharging device 11 no more electric energy is transmitted from the battery cells 8 to the external device 1 and the cells 8 are being discharged.

FIG. 5 shows a fourth embodiment of the inventive battery 3. According to the fourth embodiment, the battery 3 comprises a number of cells 8, a sensor 10 and a controlling device 9. The sensor 10 is positioned within the controlling device 9. As also shown in FIG. 5, the battery 3 is removable connected to an external device 2. The external device 2 is in form of a discharging device. The discharging device 2 comprises a processor unit. If a parameter detected by the sensor 10 is exceeding a pre-determined threshold value, the controlling device 9 is warning the user of a malfunction of the battery 3. The warning is done by an information emitting device. The user is advised by the information emitting device to connect the battery to the discharging device, in order to drain the battery cells 8, i.e. completely discharge the battery cells 8. The discharging device 2 can be part of charger, i.e. charging device.

Figure 6:
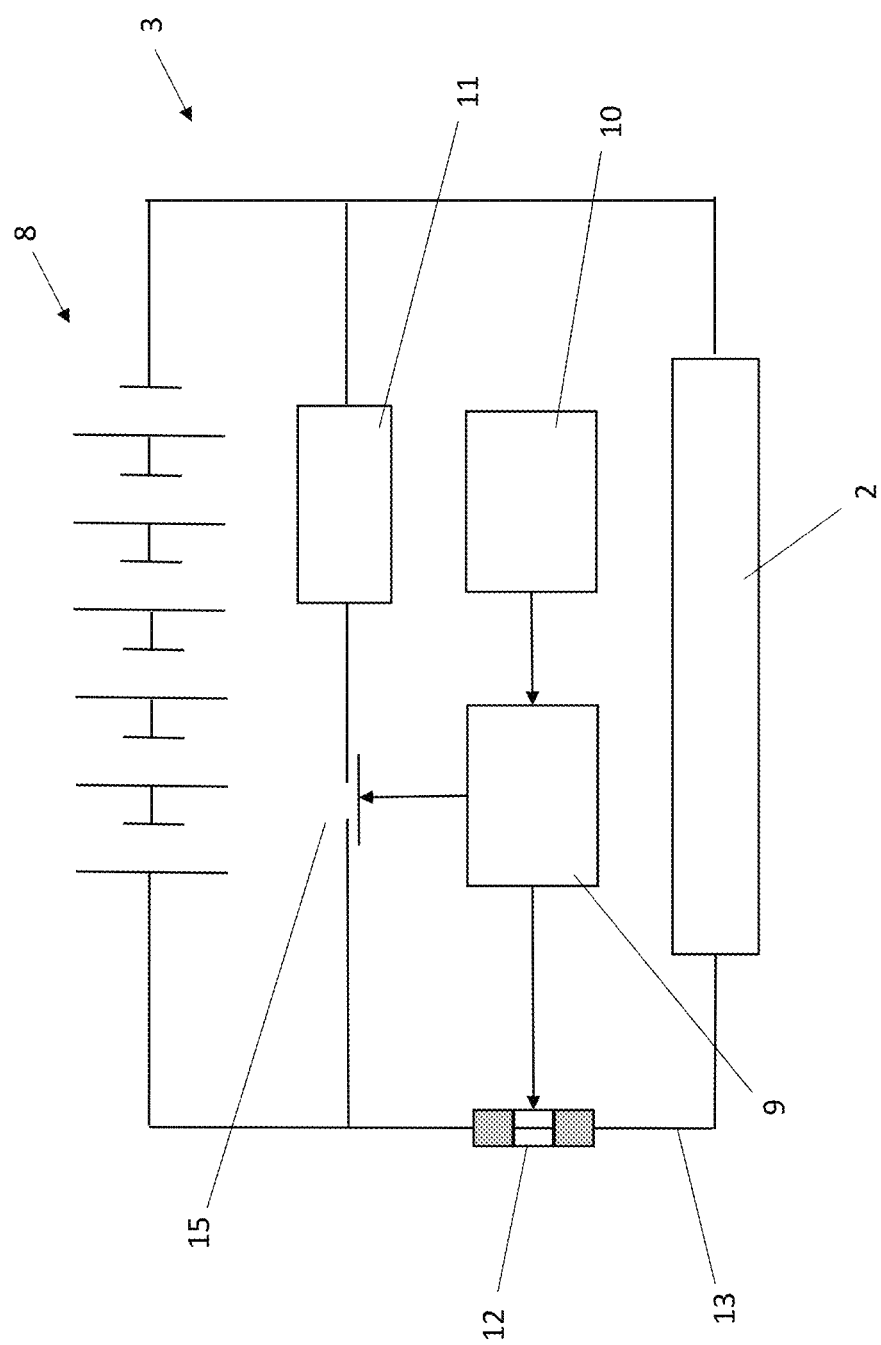
FIG. 6 a schematic circuit diagram of the inventive battery according to a fifth embodiment.

FIG. 6 shows a fifth embodiment of the inventive battery 3. According to the fifth embodiment, the battery 3 comprises a number of cells 8, a sensor 10, a controlling device 9, a discharging device 11 as well as a circuit interrupting device 12. Again, the circuit interrupting device 12 is in form of a hard fuse. As also shown in FIG. 4, the battery 3 is connected to an external device 2.

The discharging device 11 is in form of a resistor and positioned inside the housing 7 of the battery 3. If a parameter detected by the sensor 10 is exceeding a predetermined threshold value, the controlling device 9 activates the circuit interrupting device 12, in order to interrupt the circuit 13. Also, the controlling device 9 activates an additional switch 15 to activate the discharging device 11. By means of the fuse 12 and the discharging device 11 no more electric energy is transmitted from the battery cells 8 to the external device 2 and the cells 8 are being discharged.

Figure 7:
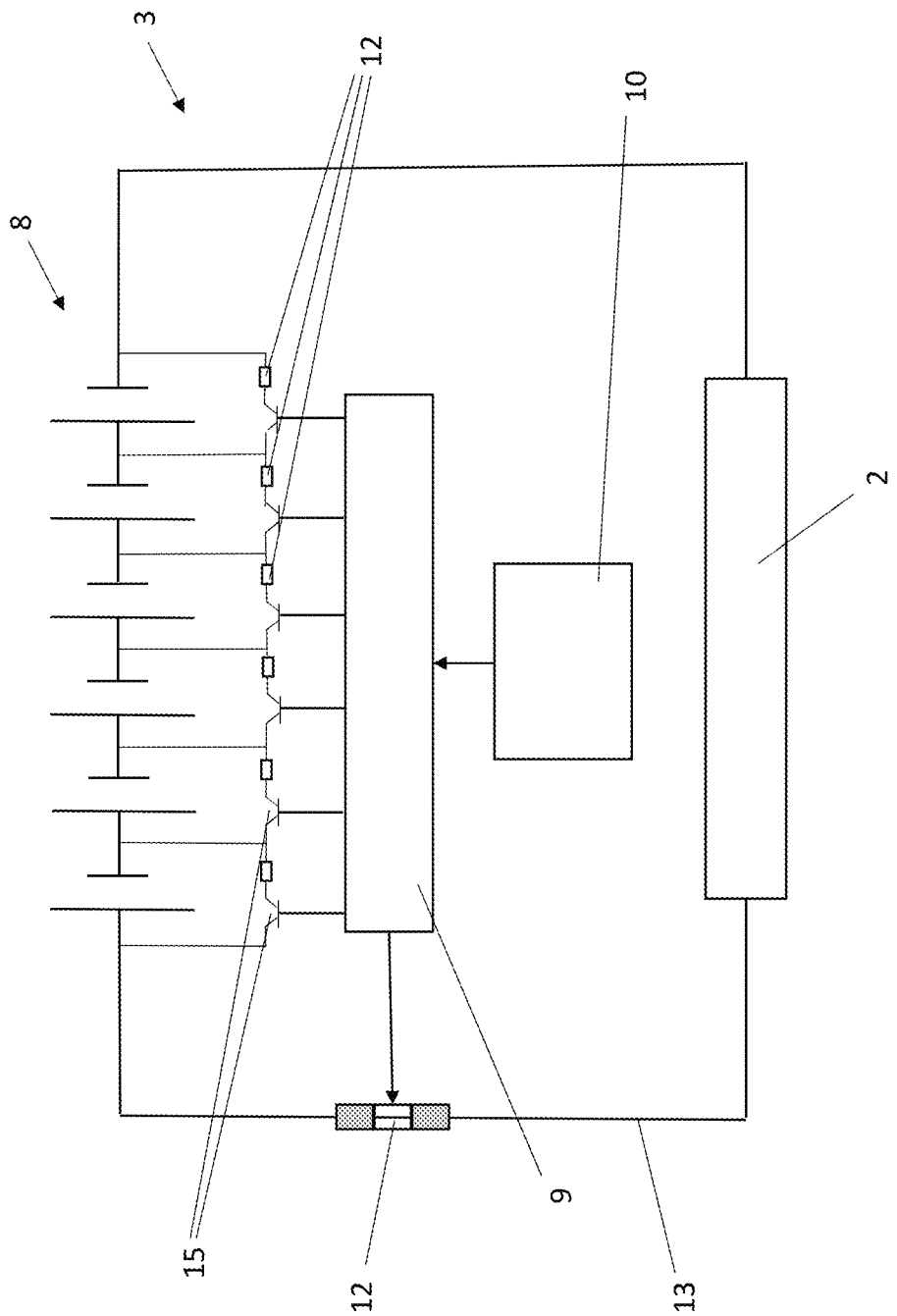
FIG. 7 a schematic circuit diagram of the inventive battery according to a sixth embodiment.

FIG. 7 shows a sixth embodiment of the inventive battery 3. According to the sixth embodiment, the battery 3 comprises a number of cells 8, a sensor 10, a controlling device 9, a number of discharging devices 11 as well as a circuit interrupting device 12. Again, the circuit interrupting device 12 is in form of a hard fuse. As also shown in FIG. 7, the battery 3 is connected to an external device 2.

As seen within FIG. 7, the controlling device 9 and discharging device 11 are just one combined device. As also shown in FIG. 7, each battery cell 8 is separately connected to a discharging device 11. Each discharging device 11 is in form of a resistor. A circuit 13 is connecting a cell 8 with its resistor 11. A switch 15 is positioned with each circuit. The switch 15 is operable by the controlling device 9. The sensor 10 is configured to detect parameters from each battery cell 8 individually. In the case one battery cells 8 is malfunctioning, the controlling device 9 closes the particular switch 15 of the malfunctioning battery cell 8. When a switch 15 is closed a cell-circuit is closed, so that the individual resistor 11 is discharging the particular battery cell 8. Malfunctioning of a battery cell 8 can be identified by the sensor 10, if a parameter detected by the sensor 10 is exceeding a predetermined threshold value. The hard fuse 12 can be activated by option.

What is claimed is:

1. A method for controlling a handheld power tool having a battery having at least one energy storage cell, a controller, at least one sensor for detecting at least one mechanical parameter or electrical parameter, a safety device, an interface for connecting the battery to an external device as well as electrical wiring for transmitting electric energy between the at least one battery cell and the external device, the method comprising the steps of:
    detecting at least one parameter via the at least one sensor so as to determine an undesired impact of the handheld power tool with a surface; and
    eliminating provision of electric energy from the at least one energy storage cell via the safety device, if a detected parameter of the at least one parameter reaches a predetermined threshold value.

2. The method as recited in claim 1 wherein the eliminating of the provision of electric energy from the at least one energy storage cell is done by interrupting the electrical wiring via a circuit interrupter as the safety device, in order to stop the transfer of electric energy between the at least one energy storage cell and the external device.

3. The method as recited in claim 1 wherein the eliminating of the provision of electric energy from the at least one energy storage cell is done by discharging the at least one energy storage cell via a discharge as the safety device, in order to stop the transfer of electric energy between the at least one energy storage cell and the external device.

4. A battery for carrying out the method as recited in claim 1, the battery comprising the at least one energy storage cell; the controller; the at least one sensor for detecting at least one mechanical parameter or electrical parameter; the interface for connecting the battery to an external device, the electrical wiring for transmitting electric energy between the at least one battery cell and the external device; and the safety device for eliminating the provision of electric energy from at least one energy storage cell, if the parameter detected by the at least one sensor reaches the predetermined threshold value, the battery being a handheld power tool battery.

5. The battery as recited in claim 4 wherein the safety device is in form of a circuit interrupter for interrupting the electrical wiring, in order to stop the transfer of electric energy between the at least one energy storage cell and the external device.

6. The battery as recited in claim 5 wherein the circuit interrupter is in form of at least one hard fuse.

7. The battery as recited in claim 4 wherein the safety device is in form of a discharge for discharging the at least one battery cell.

8. The battery as recited in claim 7 wherein the discharge is in form of at least one resistor, LED or capacitor.

9. The battery as recited in claim 4 further comprising a transceiver for sending signals regarding the detected parameters and for receiving signals to activate the circuit interrupting device for interrupting the electrical wiring, in order to stop the transfer of electric energy between the at least one battery cell and the external device.

10. A handheld power tool comprising the battery as recited in claim 4.

11. The method as recited in claim 1 wherein the at least one sensor includes an accelerometer and the undesired impact is determined if an acceleration exceeds a first predetermined threshold value.

12. The method as recited in claim 11 wherein if the acceleration exceeds a second predetermined threshold value the undesired impact is designated critical.

13. The method as recited in claim 12 wherein the second predetermined threshold value lies above 350 g.

14. The method as recited in claim 11 wherein a drop height is determined.

15. The method as recited in claim 14 wherein if the drop height exceeds the predetermined threshold value, the controller interprets the drop as potentially harmful and activates the safety device to eliminate the provision of the electrical energy.

16. The method as recited in claim 11 wherein the at least one sensor includes a piezoelectric sensor and if the piezoelectric sensor exceeds the predetermined threshold value, the controller activates the safety device to eliminate the provision of the electrical energy.

17. The method as recited in claim 11 wherein the at least one sensor includes a voltage sensor for each of a plurality of the at least one energy storage cell and measures at least first and a second voltage values and if a difference value between the first and second voltage value is greater than the threshold predetermined value, the controller activates the safety device to eliminate the provision of the electrical energy.

* * * * *